United States Patent
Leonard et al.

(10) Patent No.: US 6,176,187 B1
(45) Date of Patent: Jan. 23, 2001

(54) SLUDGE HANDLING AND FEEDING SYSTEM

(75) Inventors: R. Leon Leonard, Sacramento; Earl F. Bouse, Jr., Walnut Creek; Anne T. McQueen, Huntington Beach; Harley O. Biggs, Jr., Victorville, all of CA (US)

(73) Assignee: Cement Industry Environmental Consortium, Riverside, CA (US)

( * ) Notice: Under 35 U.S.C. 154(b), the term of this patent shall be extended for 0 days.

(21) Appl. No.: 08/772,621

(22) Filed: Dec. 23, 1996

Related U.S. Application Data (63) Continuation-in-part of application No. 08/213,718, filed on Mar. 16, 1994, now Pat. No. 5,586,510.

(51) Int. Cl.[7] .............. F23G 7/00; F23J 15/00; F27B 7/02

(52) U.S. Cl. ............ 110/215; 110/238; 110/345; 110/246; 110/346; 432/106

(58) Field of Search .................... 110/346, 347, 110/344, 345, 246, 238, 215; 422/168; 432/14, 106; 423/358, DIG. 17, DIG. 18

(56) References Cited

U.S. PATENT DOCUMENTS

| | | | |
|---|---|---|---|
| 3,529,558 | * 9/1970 | Tanner | 110/346 X |
| 3,587,488 | * 6/1971 | Mutke et al. | 110/346 X |
| 3,604,375 | * 9/1971 | Bruns et al. | 110/215 X |
| 3,736,886 | * 6/1973 | Menigat | 110/215 |
| 4,073,242 | * 2/1978 | Wagner | 110/346 |
| 4,306,978 | 12/1981 | Wuntz . | |
| 4,571,175 | * 2/1986 | Bogle et al. | 110/238 X |
| 4,640,681 | 2/1987 | Steinbiss et al. . | |
| 4,921,538 | 5/1990 | Lafer, Jr. et al. . | |
| 4,984,983 | 1/1991 | Enkegaard . | |
| 5,037,561 | 8/1991 | Copeland . | |
| 5,058,514 | 10/1991 | Mozes . | |
| 5,123,363 | 6/1992 | Martin . | |
| 5,176,088 | 1/1993 | Amrhein et al. . | |
| 5,217,624 | 6/1993 | Yamane et al. . | |
| 5,257,588 | 11/1993 | Kollmann | 110/345 |
| 5,284,405 | * 2/1994 | Carpenter | 110/238 X |
| 5,315,941 | 5/1994 | Vetterick et al. . | |
| 5,405,537 | * 4/1995 | Goff et al. | 110/238 X |

FOREIGN PATENT DOCUMENTS

WO 95/25075  9/1995  (WO) .

* cited by examiner

Primary Examiner—Ira S. Lazarus
Assistant Examiner—Ljiljana V. Ciric
(74) Attorney, Agent, or Firm—Fulbright & Jaworski L.L.P.

(57) ABSTRACT

A system for handling aqueous sludge to a combustor such that pollutant emissions associated with combustion operations, e.g., cement manufacturing, are reduced. Sludge is accumulated at a receiving site from where it is transported to a sludge conduit. The sludge is then introduced from the sludge conduit into a combustion apparatus at a point effective to reduce pollutant emissions produced by the combustion operation.

13 Claims, 9 Drawing Sheets

Step 1 - $NH_3$ released $$NH_3 + NO + 1/4 O_2 \longrightarrow N_2 + 3/2\, H_2O \quad NO_x \text{ reduction}$$

Step 2 - N volatiles released

Volatile N in fuel $\begin{cases} \longrightarrow N_2\ (90\%) \\ \longrightarrow NH_3\ (10\%) \end{cases}$ $$NH_3 + 5/4 O_2 \longrightarrow NO + 3/2\, H_2O \quad NO_x \text{ formation}$$

$$2NH_3 + 3/2 O_2 \longrightarrow N_2 + 3H_2O \quad NO_x \text{ constant}$$

$$NH_3 + NO + 1/4 O_2 \longrightarrow N_2 + 3/2\, H_2O \quad NO_x \text{ reduction}$$

FIG. 5

COMPLETELY DRIED SLUDGE
20% OF INITIAL $NH_3$ REMAINING

PARTIALLY DRIED SLUDGE
48% OF INITIAL $NH_3$ REMAINING

WET SLUDGE
$NH_3$ CONTENT:
0.4-0.8%, DRY BASIS, AS NITROGEN
100% OF INITIAL $NH_3$ REMAINING

SLUDGE HANDLING AND FEEDING SYSTEM

CROSS-REFERENCE TO RELATED APPLICATIONS

This application is a continuation-in-part of application Ser. No. 08/213,718 filed Mar. 16, 1994, now U.S. Pat. No. 5,586,510 issued Dec. 24, 1996.

FIELD OF THE INVENTION

The present invention relates to a system for handling and feeding aqueous sludge to a combustor such that pollutant emissions associated with combustion operations, such as cement production, are reduced. The invention further relates to the disposal of biological sludge, e.g., produced by waste water treatment plants, by introducing it into the combustion operation.

BACKGROUND OF THE INVENTION

Oxides of nitrogen are one of the principal contaminants emitted by combustion processes, and various combustion processes are known to generate effluent gases having an unacceptably high $NO_x$ content. In every combustion process, the high temperatures at the burner thus results in the fixation of some oxides of nitrogen. These compounds are found in stack gases mainly as nitric oxide (NO) with lesser amounts of nitrogen dioxide ($NO_2$) and only traces of other oxides, such as $N_2O$. Since nitric oxide (NO) continues to oxidize to nitrogen dioxide ($NO_2$) in the air at ordinary temperatures, there is no way to predict with accuracy the amounts of each separately in vented gases at a given time. Thus, the total amount of nitric oxide (NO) plus nitrogen dioxide ($NO_2$) and $N_2O$ in a sample is determined and referred to as "oxides of nitrogen ($NO_x$)".

Figure 1:
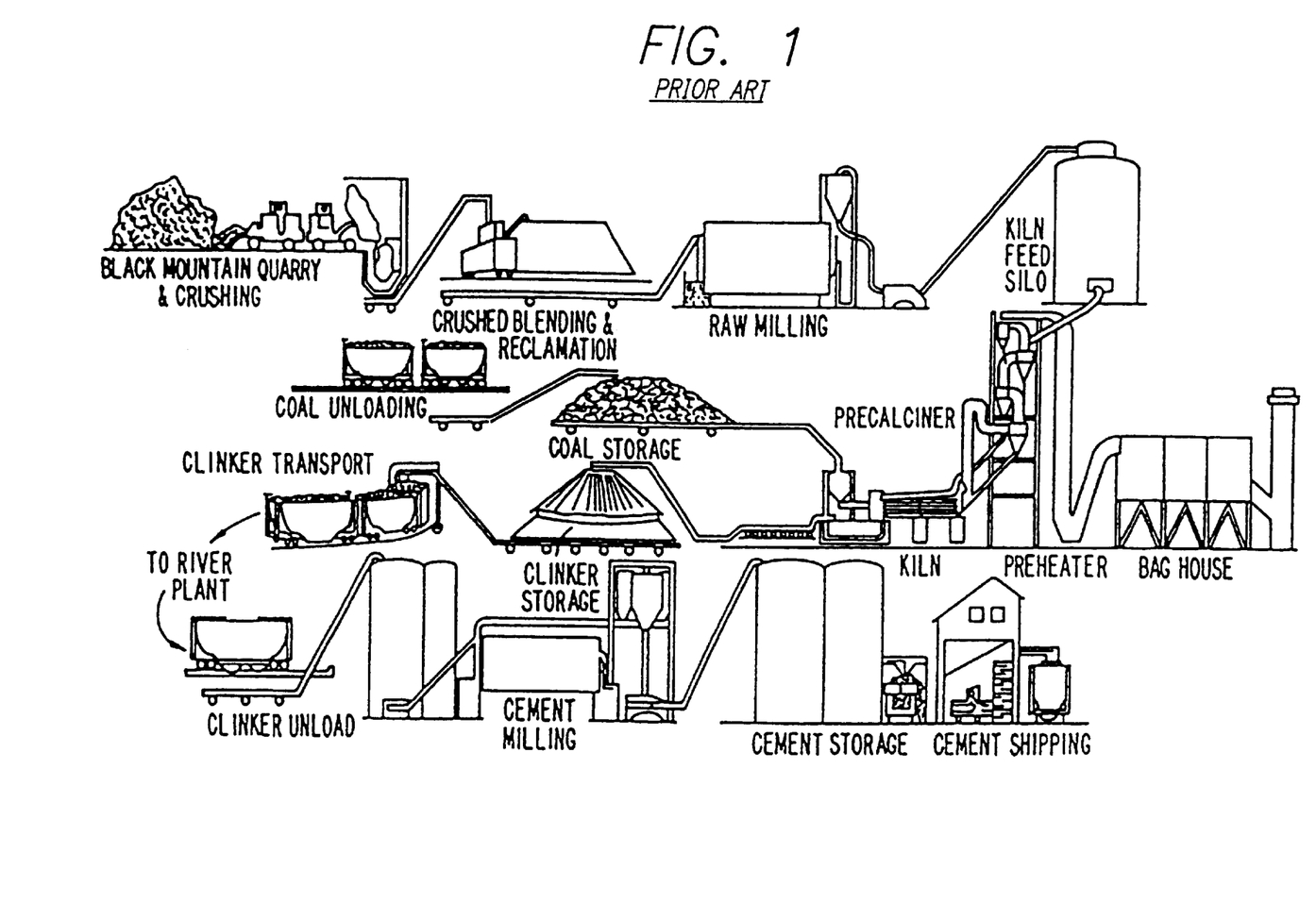
FIG. 1 is a prior art schematic diagram of a typical prior art cement manufacturing operation, from quarrying and crushing the raw materials, milling, and feeding into the kiln for clinker production, to clinker transport, milling, and shipping of the finished product.

Production of hydrogen chloride (HCl) is another undesirable side effect of combustion operations. Upon contacting water in the atmosphere, HCl forms hydrochloric acid, which contributes, as does $NO_x$, to the acid rain problem. The production of cement is a relatively complex process that involves mining and milling the raw materials, which are then fed directly into a kiln, or fed initially into a heat exchanger (typically a preheater or precalciner) which discharges the material into a kiln, and fired to produce "clinkers". The clinkers are subsequently milled and packaged for sale as cement. This prior art process is schematically illustrated in FIG. 1.

Cement kiln operations are among the combustion processes known to involve production of substantial quantities of undesirable $NO_x$ and HCl. $NO_x$ emission can be decreased by introducing a reducing agent, such as ammonia, into the combustion mixture.

With the technology currently available, reduction of HCl emissions requires the use of a wet scrubber. Wet scrubbers increase the complexity of a combustion process, and greatly increase the cost of combustion operations.

Various modifications of kiln operations have been attempted to reduce the level of emissions of pollutants, and to take advantage of the combustion process to incinerate undesirable waste as well. In particular, waste water treatment plant sludge (i.e., biological sludge) has been used as a feed material in cement kiln operations, which in turn eliminates the sludge.

For example, Yamane et al., (U.S. Pat. No. 5,217,624, issued Jun. 8, 1993) describes a process for introducing waste treatment sludge into a cement kiln, and introducing gases generated during processing of the sludge into the kiln as well in order to reduce $NO_x$ content of the exhaust gas. Yamane et al. specifically describes a process of mixing sludge with quicklime to produce slaked lime and sewage sludge. The mixture is dehydrated, releasing gases including ammonia. The remaining solids are introduced into a cement kiln, where the lime and inorganic substances become raw materials for cement, and the organic substances become fuel for cement burning. Dust and water vapor present in the gases produced during dehydration are removed by filtration and distillation, respectively, allowing introduction of the gas containing ammonia into the kiln. The gas containing ammonia helps reduce $NO_x$ emissions. Lafser, Jr. et al. (U.S. Pat. No. 4,921,538, issued May 1, 1990) concerns a method for recycling and reusing contaminated earth and mineral matter in the manufacture of cement clinkers. The contaminated material is mixed with inorganic constituents in water to form a raw material slurry suitable for manufacture of Portland cement, and is then charged to a cement kiln.

Wuntz (U.S. Pat. No. 4,306,978, issued Dec. 22, 1981) concerns a method for lime stabilization of waste water sludge. The sludge is dewatered to produce a sludge cake having 10 to 60% solids and this is then mixed with calcium oxide to produce stabilized sludge pellets.

Steinbiss et al. (U.S. Pat. No. 4,640,681, issued Feb. 3, 1987) concerns a method and apparatus for removal of hazardous and waste materials of low heat content, such as refuse. Among the wastes considered are "household wastes, agricultural waste and industrial waste."

Enkegaard (U.S. Pat. No. 4,984,983, issued Jan. 15, 1991) concerns a method and apparatus for co-firing hazardous organic waste in solid pasty, greasy or sludge form by introducing it directly into the burning zone of an industrial rotary kiln and burning the waste in such zone simultaneously with cement kiln or lightweight aggregate. In particular, the waste is gasified prior to injecting the gas into the kiln. The gasification may be accomplished in a conventional gasifier such as is used for coal gasification.

Mozes et al. (U.S. Pat. No. 5,058,514, issued Oct. 27, 1991) describes a method for the simultaneous control of sulfur dioxide and $NO_x$ emissions from power plant flue gases. In the method described, an aqueous slurry of limestone and a nitrogenous progenitor such as urea is injected into the furnace at temperatures ranging between 900° C. and 1350° C.

Somewhat similar to the above, Amrhein et al. (U.S. Pat. No. 5,176,088, issued Jan. 5, 1993) discloses, among other things, the injection of ammonia into a furnace region having a temperature of about 1600° to 2000° F., to reduce $NO_x$.

There is, therefore, a need in the art to reduce pollutant emissions produced during combustion processes, such as cement kiln operations. In particular, there is a need to reduce $NO_x$ emissions.

There is also a need in the art to reduce HCl emissions produced during combustion processes, particularly cement kiln operations.

There is an additional need in the art to provide for a safe, cost-effective and efficient system for handling and feeding aqueous sludge to the combustor (typically a cement kiln in association with a precalciner).

There is a further need in the art to utilize and eliminate sewage sludge.

These and other needs in the art are addressed by the present invention, as described below.

SUMMARY OF THE INVENTION

The present invention is directed to a system for handling and feeding aqueous sludge to a combustor such that pollutant emissions resulting from combustion of the sludge are reduced. The process by which the system operates is described in detail in parent application Ser. No. 08/213,718, now U.S. Pat. No. 5,586,510 (issued Dec. 24, 1996) which is incorporated by reference in its entirety. Such process involves the introduction of an aqueous (wet) sludge into the combustion mixture during a combustion operation in order to reduce emissions of undesirable pollutants, in particular $NO_x$ and HCl. The invention provides for introducing particles of aqueous sludge into a combustion operation in an amount and at a point in the combustion operation effective to reduce $NO_x$, and in some instances, HCl, emissions in outlet flue gasses produced by the combustion operation. Preferably, an amount of sludge effective for optimal reduction in $NO_x$ and HCl emissions is introduced into the combustion operation at a point in which maximum pollutant, e.g., $NO_x$ and HCl, emission reduction can occur. Generally, an optimal point for introduction in the combustion operation is in the outlet flue gases where the temperature is between about 1500° F. to about 1800° F. In a specific aspect in which the sludge is introduced in a combustion operation comprising a kiln and a precalciner, such as in a cement kiln operation, the sludge is introduced at a point downstream of the precalciner combustion zone where the kiln outlet flue gases and precalciner flue gases are mixed.

Sludge particles can be formed by introducing aqueous sludge through an appropriately sized aperture under pressure, using atomizing air, such that a sufficient amount of sludge is introduced to effect a reduction in $NO_x$ emissions. Atomizer design and atomizer pressure, particularly air pressure, can be varied after determining the optimum amount of sludge to be introduced in order to produce an optimum particle size. Optimal particle size will be reflected by improved kiln performance and greater reductions in pollutant emissions, or other performance parameters desired for the kiln operation. The particles of sludge are typically not larger than approximately 25 mm, but this may vary with sludge from various sources and moisture content, and is not critical.

As described in parent application Ser. No. 08/213,718, now U.S. Pat. No. 5,586,510, the aqueous sludge is introduced at a point in the combustion operation in which the temperature is approximately 1500° F. to approximately 1800° F.; preferably, the temperature is approximately 1700° F. In general, the sludge that is introduced into the combustion operation contains a sufficient amount of moisture to be readily transported to and introduced into the combustion process, e.g., a kiln, in particle form. Preferably, the moisture (water) content is not excessive, as this will reduce the amount of steam produced and thus the volume of stack gases. The sludge can typically comprise up to about 80% to about 85% water by weight, and cannot comprise less than about 65% to about 70% water. Preferably, the sludge comprises from about 70% to about 80% water by weight. The optimal water concentration of the sludge is readily achieved by mechanical dewatering operations, e.g., centrifuges and belt presses, typically produced and disposed of by sanitation districts. These dewatering operations do not significantly affect the ammonia content of the wet sludge.

If the sludge delivered to the site of the combustion operation is outside the appropriate moisture range, the invention contemplates reducing or increasing water content to compensate. For example, if the moisture content of the sludge is too high, partial reduction in water content, e.g., by mechanical dewatering or evaporation, although enough moisture remains even after reducing the water content to allow for pumping of the sludge and direct introduction into a kiln. If the water content is too low, water can be added to the sludge. Since drying is expensive, it is unlikely that sludge that is too dry will be provided.

The process described in parent application Ser. No. 08/213,718, now U.S. Pat. No. 5,586,510, advantageously provides for maximum introduction of ammonia contained in sludge. Most of the ammonia which is present in the sludge is dissolved in the aqueous phase. Ammonia is also released from the particles of sludge that are wet and that enter at the desired point. Thus, the invention advantageously provides greater economy and efficiency in reducing pollutant emissions.

Introduction of aqueous sludge in the combustion operation is a significant advantage. Sludge typically contains more than 85% water, and according to the prior art, substantially all of the water is required to be removed from the sludge before the solid materials are introduced into the cement kiln. Mechanical dewatering can bring the moisture content to about 80% water. However, removal of water, especially when drying is required, dramatically increases the expense and complexity of sludge disposal.

In another aspect, the invention relates to a combustion operation apparatus, such as a kiln, and means for introducing aqueous particles of sludge into the combustion operation apparatus. Such means preferably comprises means for generating particles of sludge of the desired size, e.g., an atomization system. Thus, the means for introducing aqueous particles of sludge into the combustion operation requires apparatus not normally associated with usual combustion operations, such as a prior art cement kiln as depicted in FIG. 1. Such combustion operation apparatus further comprises means and machinery typically associated with the combustion operation, e.g., cement production.

DETAILED DESCRIPTION OF THE INVENTION

The present invention pertains to a system for handling and feeding aqueous sludge to a combustor such that pollutant emissions resulting from combustion of the sludge are reduced. The system of the present invention comprises:

(a) combustion means;

(b) first receiving means for receiving the sludge to be combusted;

(c) means for transporting the sludge from said first receiving means to a sludge conduit;

(d) second receiving means for receiving the sludge from the sludge conduit; and (e) means for introducing the sludge from the second receiving means into the combustion means at a point effective to reduce pollutant emissions produced by the combustion of the sludge in the combustion means:

Preferably, the combustor means of the system of the present invention comprises a cement kiln containing a flue gas outlet. Desirably, a precalciner containing a flue gas outlet is present in association with the kiln.

Preferably, the means for introducing the sludge into the combustion means is located in the precalciner flue gas outlet downstream of a precalciner combustion zone and at a point wherein gases in the kiln flue gas outlet and the precalciner flue gas outlet are mixed. The means for introducing the sludge into the combustion means preferably comprise an atomization system located at the point at which the sludge is introduced. It is also preferred that the means for introducing the sludge into the combustion means further comprise pumping means in fluid communication with the atomization system for transferring the sludge to the atomization system. Beneficial results are obtained when the means for introducing the sludge is introduced into the combustion means further comprise means for introducing water into the sludge, whereby the water lubricates the sludge, thereby reducing friction in the sludge conduit.

Typically, the first receiving means for receiving the aqueous sludge to be combusted comprise at least one sludge hopper having a capacity of 0.5–100 tons. The means for transporting the sludge from the first receiving means to the sludge conduit may be one or more screw feeders which are preferably present in fluid communication with an appropriate pumping means, such as a hydraulic piston pump.

The second receiving means for receiving the sludge from the sludge conduit preferably comprise at least one sludge slinger surge bin hopper having a capacity of about 1 to 100 cubic feet capacity. Preferably, the sludge slinger surge bin hopper is in fluid communication with a sludge slinger by means of least one screw feeder means which communicates with an outlet of the hopper and an inlet of the sludge slinger. The outlet of the sludge slinger is preferably in fluid communication with an inlet of a precalciner associated with the combustion means by means of at least one aspirated nozzle which injects the sludge into the precalciner.

The present invention will be further understood by reference to the following drawings and accompanying description.

DETAILED DESCRIPTION OF THE DRAWINGS

A principal object of the invention is to provide an effective, efficient system for handling and feeding aqueous sludge to a combustor at a point in a combustion operation processing stream where it will be effective to reduce pollutant levels in the outlet gases of the combustion operation. In particular, the invention is directed to a system for reducing $NO_x$ and HCl production in a kiln, in particular, a cement kiln.

As used herein, the term "kiln" is intended to refer generally to a combustion operation apparatus used in combustion operations or processing in the manufacture of materials or the production of energy. Thus, the term "kiln" as used throughout this application, unless otherwise indicated, refers to any such combustion operation apparatus.

Preferably the combustion operation involves a kiln. In a specific embodiment, the invention provides for introduction of aqueous sludge in a cement kiln used in the production of portland cement clinkers. It is readily appreciated that portland cement is a hydraulic cement produced by numerous cement manufacturers. In addition to kilns used for cement production, the invention specifically contemplates introducing sludge in kilns, particularly rotary kilns, used in the production or manufacture of lime, bricks, minerals, paper, etc. The term "kiln" further encompasses long dry kilns, kilns associated with boilers, preheater kilns, precalciner kilns, wet kilns, and the like. The invention further extends but is not limited to combustion processes in metal manufacturing, glass manufacturing, and energy production, e.g., combustion of coal to produce electricity.

The present invention preferably is utilized in a process involving the introduction of aqueous sludge into the kiln processing stream in which the ratio of ammonia ($NH_3$) to non-ammonia nitrogen is sufficient to provide for $NO_x$ reduction. Although not intending to be bound by any particular theory of the mechanism of $NO_x$ emission reduction, it is believed that a decrease in $NO_x$ emissions following introduction of aqueous sludge into a combustion operation involves selective reduction of $NO_x$ by $NH_3$. Accordingly, the process does not require the overall $O_2$/fuel ratio to become fuel rich (stoichiometric air). Some $NO_x$ reduction, and inhibition of N volatile conversion to $NO_x$, can also result from local reducing zones produced by sludge combustion. The selective reduction mechanism proposed herein explains why larger quantities of sludge, which would lead to high CO emissions, are not required to achieve the same level of pollutant emission reduction. Thus, the quantity of sludge used according to the present invention is advantageously lower than that typically used when dried sludge is used as a fuel. Furthermore, according to the invention, ammonia release accompanies drying and proceeds nitrogen volatiles release of the sludge introduced into the kiln processing stream.

The introduction of sludge can result in introduction of $NH_3$ that may not react with and reduce $NO_x$. Instead, this unreacted $NH_3$ "slip" can react with and neutralize HCl to form $NH_4Cl$ salts further downstream in the flue outlet, e.g., at temperatures of about 700° F. or less. In cement kiln operations, this reaction will generally occur upstream of or in the baghouse. However, most of the $NH_3$ reacts to reduce $NO_x$s, rather than escapes as slip, which would result in plume formation.

The sludge is introduced into the kiln in particles, in which particle size range is selected to meet the requirements of particle carryover, particle drying time, and particle penetration necessary to accomplish the drying, ammonia release and ultimately combustion of the sludge. Particle size is preferably an operational parameter determined by the effects on combustion operation. Particle size may be varied by varying the atomizer type and atomization air pressure, while maintaining the amount of sludge to be introduced.

The following factors are considered in determining the optimum rate of introduction of the sludge, particle size of the sludge, and other factors for designing kilns according to the present invention. The size, type, fuel consumption and operating temperature of the kiln are very important. The concentration of oxygen, $NO_x$, CO, and HCl in the kiln gas outlet and precalciner gas outlet in the absence of sludge are important. Also critical are gas temperatures at the site of introduction, e.g., the mixing chamber or, if present, the precalciner. Another critical factor in designing systems of the invention is the content of ammonia, non-ammonia nitrogen, moisture and BTUs in the sludge. Once these factors are determined, a sludge injection rate can be determined to provide conditions in the kiln gas outlet sufficient to achieve potential $NO_x$ reductions of as much as 30% (i.e., $NH_3/NO_x$ molar ratio of approximately 0.3). The sludge injection rate is also preferably determined with respect to providing a small amount of $NH_3$ slip to react with and neutralize hydrogen chloride to form ammonium chloride salt, while avoiding plume formation.

An injection rate of about 5000 to about 10,000 lbs of sludge per hour, calculated on a dry weight basis (corresponding to approximately 10–20 tons per hour wet, in which the water content is about 75%), is expected to achieve $NO_x$ reductions of about 15% to about 30% in a cement kiln having the parameters shown in Table 1. Higher injection rates may further lead to higher $NO_x$ reduction levels.

TABLE 1

KILN PARAMETERS

| Parameter | Units | Kiln Gas Outlet | Pre-calciner Gas Outlet | Stack |
|---|---|---|---|---|
| Flue gas | DSCFM | 40,000 | 103,000 | 178,000 |
|  | WACFM | 208,000 | 446,000 | 298,000 |
|  | lb/hr wet | 201,000 | 544,000 | 879,000 |
| $CO_2$ | vol % dry | 17 | 29 | 17 |
| $O_2$ | vol % dry | 2 | 2 | 10 |
| $N_2$ | vol % dry | 81 | 69 | 73 |
| $H_2O$ | vol % | 6.9 | 5.7 | 3.4 |
| $NO_x$ | ppmvd actual | 1,150 | 610 | 350 |
|  | lb/hr | 330 | 446 | 446 |
|  | lb/MMBTU | 1.65 | 1.06 | 1.06 |
|  | lb/ton clinker | 2.64 | 3.58 | 3.58 |
| Gas temperature | °F. | 1900–2100 | 1600–1700 | — |
| Gas velocity | ft/s | 31 | 66 | — |
| Gas length | ft | 187 | 186 | — |
| Gas residence time | s | 6.1 | 2.8 | — |

| Parameter | Units | Kiln | Precalciner | Total |
|---|---|---|---|---|
| Feed rate | TPH | — | — | 186 |
| Clinker rate | TPH | — | — | 125 |
| Coal consumed | TPH | 7.99 | 7.35 | 15.34 |
| Tires consumed | TPH | — | 1.28 | 1.28 |
| Energy consumed | MMBTU/hr | 200 | 222 | 422 |

The potential for $NO_x$ reduction of in the kiln outlet gases is preferably greater than about 30%. The principal assumptions in determining this value are the content of ammonia present in the wet sludge that is released with water upon introduction of the particles of sludge into the kiln and the baseline $NO_x$ emissions in the absence of sludge. Furthermore, it is believed that the dried sludge volatile nitrogen conversion to $NO_x$ is minimized by appropriate selection of the injection location and the foregoing parameters.

As used herein, the following terms have the given meanings:

The term "pollutant" refers to a component of combustion exhaust gases that has harmful or noxious properties. The present invention provides for reduction pollutant emissions. More particularly, the term "pollutant" refers to compounds that can react in the atmosphere to form acids and contribute to ambient ozone formation. In specific aspects, the term pollutants refers to $NO_x$ and HCl.

The term "aqueous sludge" generally refers to biosolids suspended or admixed in water, such as aqueous sewage produced by waste water treatment plants. It is a particular advantage of the present invention that it provides for the efficient and economical disposal of sewage sludge by using it to make cement. However, the invention contemplates use of aqueous organic solids or biosolids other than sewage sludge.

The sludge comprises between about 0.4% and about 1.5% ammonia by weight, calculated on a dry basis as nitrogen. The ratio of non-ammonia to ammonia nitrogen by weight is approximately 1.5 to approximately 12.0. Additional components of sludge include but are not limited to carbon, hydrogen, oxygen, Sulfur and other elements. Sludge comprises volatile components as well as solids which upon combustion produce ash. The sludge advantageously contains water, thus eliminating the step of dehydration that is necessary according to prior art methods for combustion of sludge.

Generally, the water content of the sludge that is introduced into the combustion operation ranges from about 65–70% up to about 80–85%, by weight. Preferably, the moisture content is about 70% to about 80% water, by weight. In a specific embodiment, the moisture content is approximately 75%. If the water content is too high, the evaporation of water will lead to overall cooling that can adversely affect the combustion operation or limit the potential reduction in pollutant emissions. If the water content is too low, it may not be possible to introduce particles of sludge into the combustion operation. Parameters of a specific example of a sludge sample are shown in Table 2.

TABLE 2

SLUDGE PARAMETERS

| Parameter | Units | Minimum | Average | Maximum |
|---|---|---|---|---|
| C | wt %, dry | 25 | 27.5 | 30 |
| H | wt %, dry | 4 | 4 | 4 |
| O | wt %, dry | 3 | 3 | 3 |
| S | wt %, dry | 2.5 | 2.75 | 3 |
| Total volatiles | wt %, dry | 37.5 | 41.25 | 45 |
| Ash | wt %, dry | 62.5 | 58.75 | 55 |
| Total N | wt %, dry | 3.0 | 4.0 | 5.0 |
| $NH_3$ | wt %, dry | 0.9 | 1.2 | 1.5 |
| non-$NH_3$, N | wt %, dry | 2.25 | 3.0 | 3.75 |
| Solids content | % solids | 25 | 30 | 35 |
| Water content | % moisture | 75 | 70 | 65 |
|  | lb/lb dry solids | 3.0 | 2.3 | 1.9 |

TABLE 2-continued

SLUDGE PARAMETERS

| Parameter | Units | Minimum | Average | Maximum |
|---|---|---|---|---|
| BTU content | BTU/lb dry solids | 4,500 | 5,400 | 6,300 |
|  | BTU/lb volatiles | 12,000 | 13,000 | 14,000 |

The water content of the sludge is only important when the sludge is introduced into the combustion operation. In most cases, no additional processing of the sludge prior to introduction into the combustion operation is required. Nevertheless, it is advantageous to adjust the water content of sludge that may have too high or too low a water content, although as a practical matter, neither possibility is likely. This is because sludge of a high water content is expensive to transport, since much of the material is water. Sludge of a low water content is more expensive, since drying requires space for drying ponds and time. Thus, there is no incentive to produce sludge that is too for use according the invention. Nevertheless, the invention provides for reducing, but not eliminating, the moisture content of the sludge that contains too much water, e.g., by mechanical dewatering (with a belt press or centrifuge) or evaporation, so as to reduce the amount of steam produced on combustion of the sludge. The invention further provides for adding water to sludge with too low a moisture content.

It will be further recognized that the sludge itself also acts as a fuel. That is, the sludge has energy content, which can be represented in BTUs. For example, the energy content per pound of dry solids in the sludge is on the order of about 4500 to about 6500 BTU; the energy content of volatiles present in the sludge is on the order of approximately 12,000. Consequently, introduction of sludge in the combustion operation results in a small net decrease in energy consumption. This net decrease in energy consumption is partly offset by the moisture content of the sludge, but the net BTU content of the aqueous sludge is positive (with net fuel savings) at the moisture content of the sludge.

As used herein, the term "atomization system" refers to an apparatus or means for generating particles of defined size from the sludge. For example, the atomization system may be a rotary atomization system in which steam or air forces the aqueous sludge through an atomizer in such a way as to generate particles of sludge, a gunnite nozzle under pressure, or dual fluid atomizer. In specific embodiments, particles ranging in size from approximately 5 millimeters to approximately 25 millimeters can be generated. However, the actual particle size need not be determined, or necessarily fall within this range if it is determined. The critical point is that the atomization system produces particles of sludge that, upon introduction into the combustion operation, result in a decrease in pollutant emissions.

Figure 2:
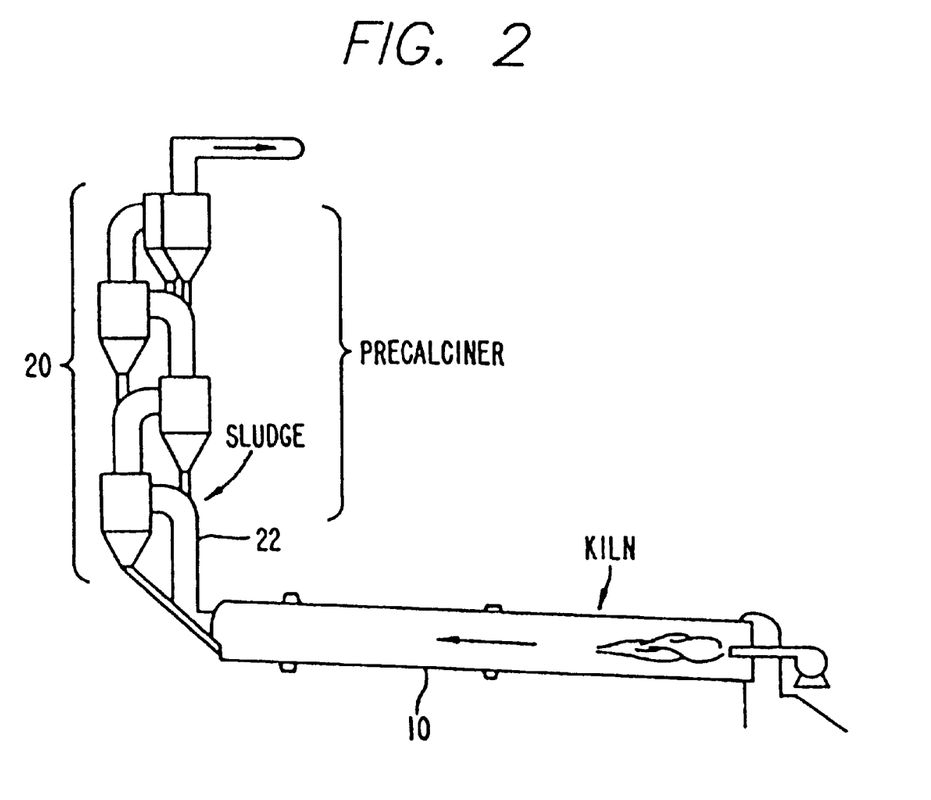
FIG. 2 is a schematic diagram of a precalciner and cement kiln. A preferred site for introduction of aqueous sludge according to the invention is shown by the arrow.
Figure 3:
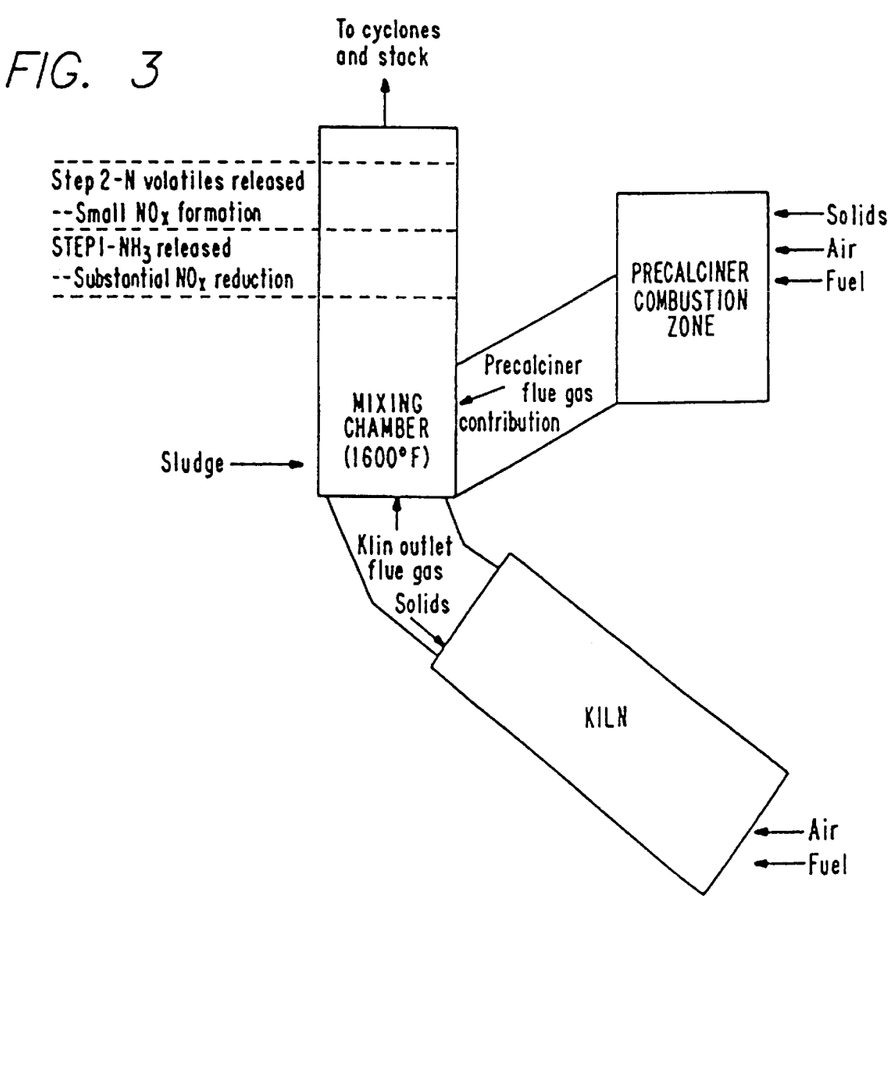
FIG. 3 is a schematic diagram of cement kiln location for sewage sludge introduction, which should be in the mixing chamber. The diagram indicates schematically events affecting $NO_x$ emissions after introduction of the sludge. In particular, the theoretical reactions with $NH_3$ and N volatiles that affect $NO_x$ production are noted in the figure.

Referring now to FIG. 2, which depicts a typical cement kiln 10 and precalciner 20, in a preferred aspect of the invention, the sludge is introduced at a point in the precalciner flue gas inlet 22. More preferably, the sludge is introduced in the precalciner, downstream of the precalciner combustion zone and of the entry point of kiln outlet flue gases (FIG. 3). In this configuration, the invention advantageously provides for the reduction of pollutant emissions that result from both kiln and precalciner combustion operations. The present invention contemplates that the temperature of the flue gas at the point of introduction of the sludge is in the range of approximately 1500° F. approximately 1800° F.; more preferably, the temperature is approximately 1700° F.

Figure 4:
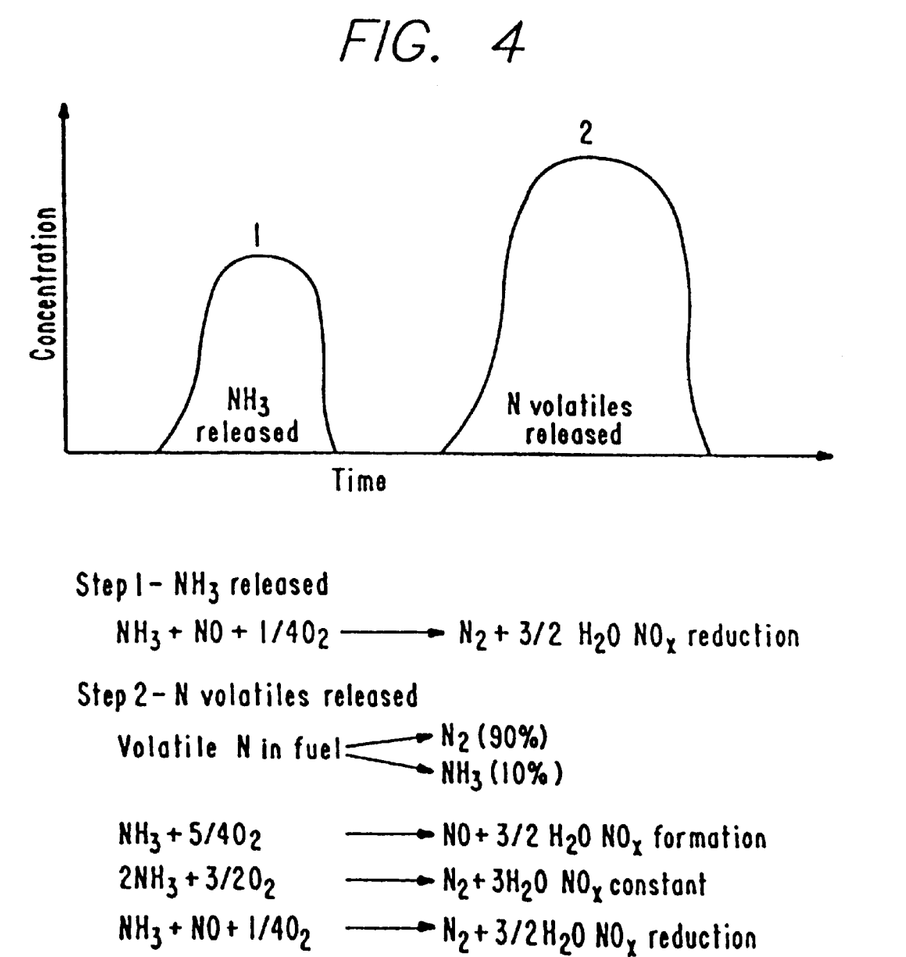
FIG. 4 is a schematic diagram of the fate of sewage sludge nitrogen after introduction into the kiln. The steps in FIG. 4 relate to the steps in FIG. 3.

Upon introduction of the sludge into the flue gases, a series of events are expected to occur resulting in reduction of $NO_x$ emissions. Initially, the water and more importantly, ammonia present in the sludge are released. The ammonia released in this step combines with NO and oxygen to produce molecular nitrogen and water. This is the point of substantial reduction in the $NO_x$ levels in the gases. After the initial release of ammonia and water, volatile nitrogens, including ammonia present in the solid particles of sludge are released. The overall reaction is one that results in a small amount of $NO_x$ formation. The overall effect of the process is a substantial reduction in $NO_x$ emissions, in additional to elimination of the sludge. The reaction is summarized in FIG. 4.

Ammonia released upon introduction of the sludge can also effect a reduction in HCl emissions. The sludge $NH_3$ slip from the reaction between sludge $NH_3$ and $NO_x$s can react with HCl in the baghouse to form $NH_4Cl$, thus neutralizing the HCl. Neutralizing HCl in this fashion avoids the need to use a wet scrubber to reduce HCl emissions.

As pointed out above, reduction of pollutant emissions in the flue gases depends primarily on release of ammonia from the sludge. A particular advantage of the present invention, therefore, is that the ammonia content of the sludge is high, and at the same time the sludge provides energy.

Figure 5:
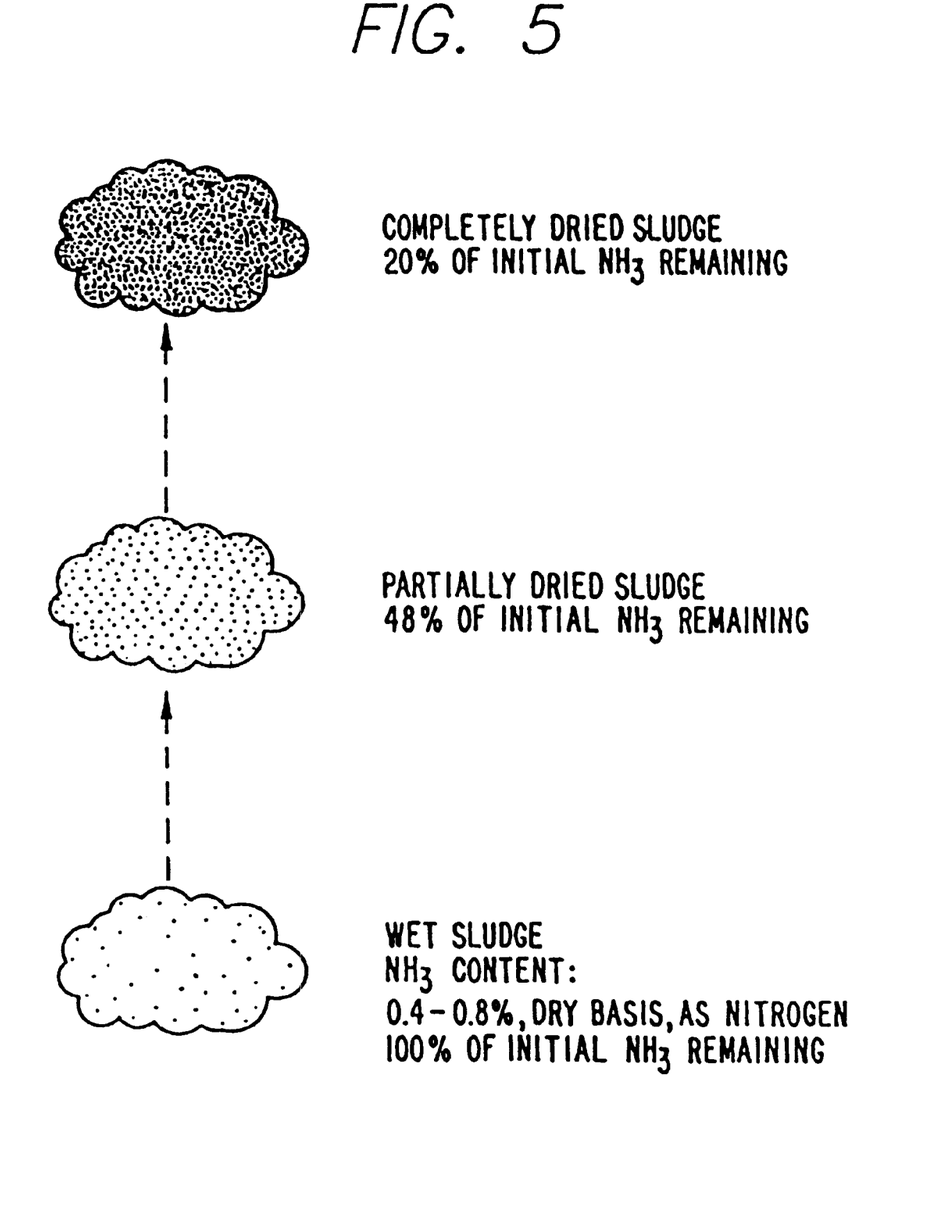
FIG. 5 is a schematic diagram for $NH_3$ release from a particle of sludge introduced into the kiln.

Wet sludge contains 100% of the ammonia present in the sludge (FIG. 5). Based on a model system, it is expected that after the sludge particle partially drys at the high temperatures of the kiln, approximately 48% of the initial ammonia remains. Thus, it is clearly an advantage of the present invention that all of the ammonia present in the sludge is available for reaction in the flue gases to reduce $NO_x$ and HCl emissions.

Figure 6:
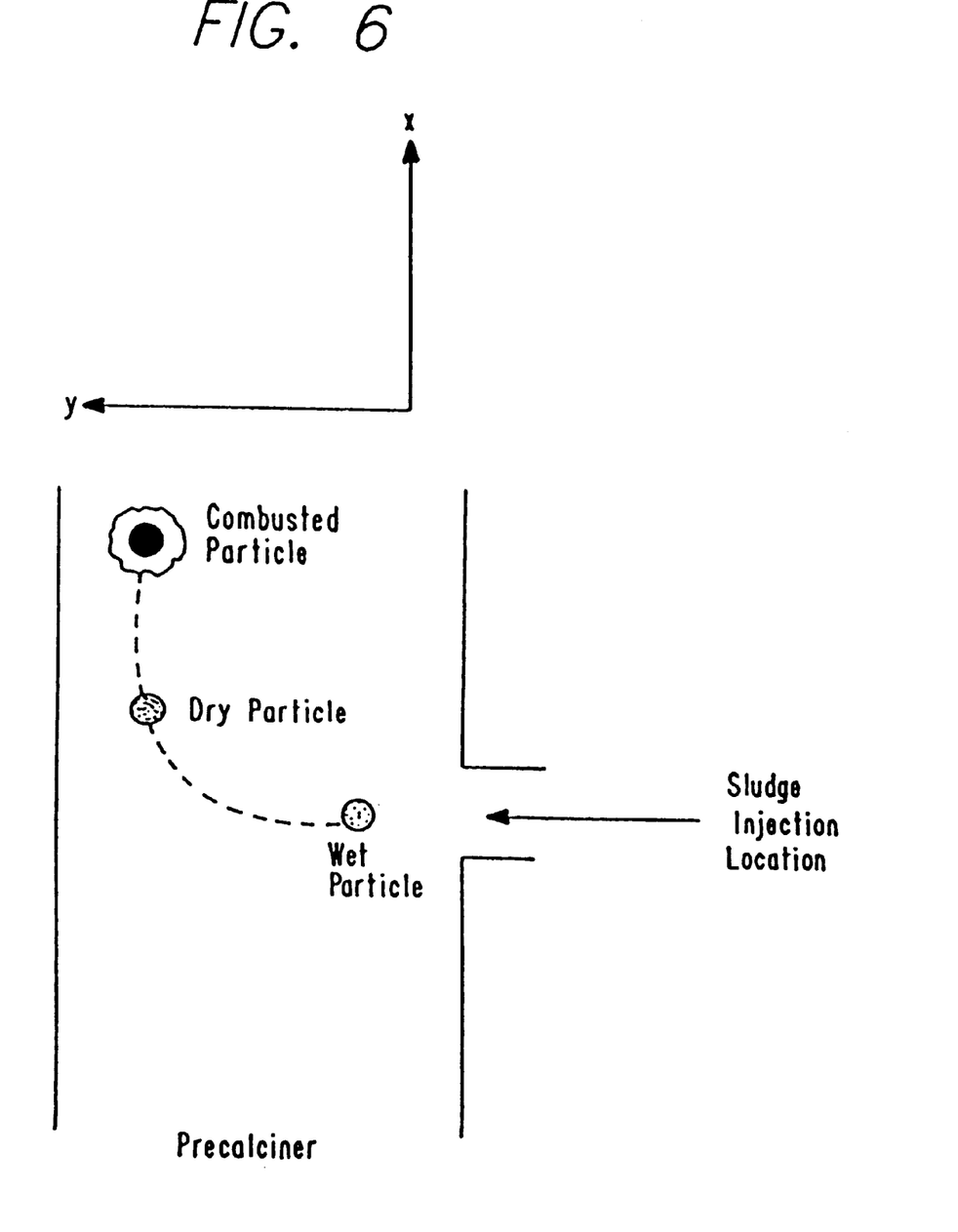
FIG. 6 is a diagram of sludge particle behavior after introduction into the precalciner of a cement kiln. Horizontal movement proceeds along a vector in the y direction; vertical movement proceeds along a vector in the x direction. Movement in the x direction is a function of particle size, and in the y direction is a function of injection velocity. Drying of the particle occurs after injection into the kiln.

FIG. 6 provides a schematic diagram for the behavior of sludge particles introduced into the kiln. The wet sludge is injected into the appropriate site in the combustion operation. As can be readily appreciated, there is a substantial flow of combustion gases in an upward direction. Thus, there are two component vectors to the motion of each sludge particle; vertical motion in the X direction, which depends on the velocity of flue gases, and horizontal velocity in the Y direction, which depends on the velocity at which the sludge is injected. Each particle of sludge will have a drying time that depends on the particle size. The drying time in turn effects the length of time during which the particle will be subject to the forces in the X and Y directions. The longer the drying time, the farther the distance traveled in each direction. The particle size of the sludge is selected to meet the requirements for particle carryover, particle drying time, and particle penetration necessary to most efficiently effect pollutant reduction in the flue gases.

The amount of sludge introduced in the system is determinative of the extent of $NO_x$ emission reduction. The more sludge introduced, the greater the reduction in $NO_x$ emissions expected. However, too much sludge can overload the combustion system. The actual amount of sludge to be introduced will depend on the characteristics of the kiln, e.g., the type of kiln, size of the kiln, amount and type of fuel used to fire the kiln, etc., as discussed above. The amount of sludge to be introduced can be varied in order to optimize reduction in the levels of pollutant emissions.

A sludge injection rate of greater than approximately 5000 to approximately 10,000 lb/hr calculated on a dry weight basis, is expected to provide for approximately a 15–30% reduction in $NO_x$ emissions in a cement kiln having the parameters shown in Table 1.

Since the process envisions that ammonia release will primarily accompany drying, and precede nitrogen volatile release, the ammonia in the flue gas will be present before the nitrogens that can be used in the formation of $NO_x$.

Figure 7:
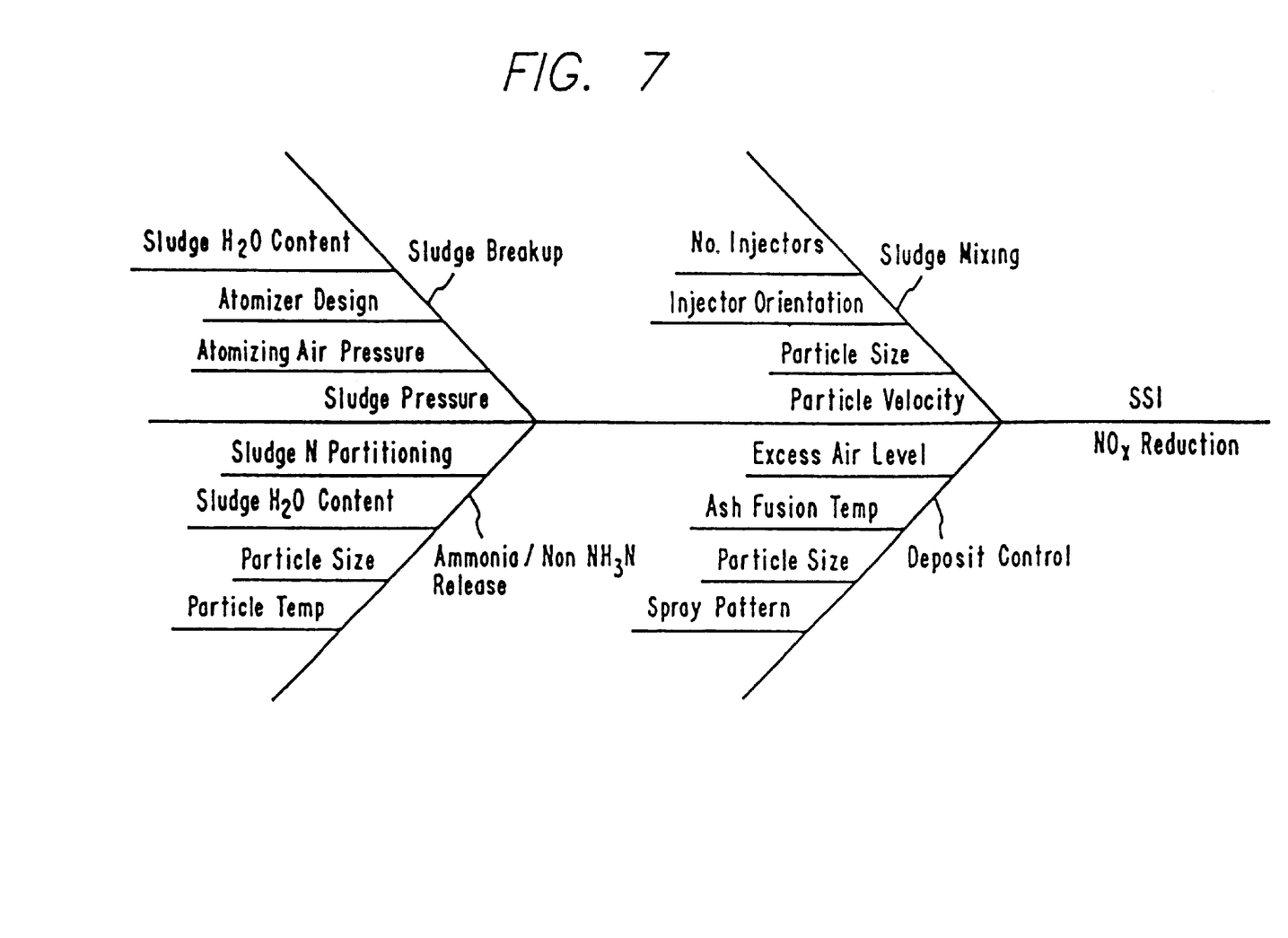
FIG. 7 is a schematic diagram of the parameters involved in decreasing $NO_x$ emissions in the cement kiln outlet gasses.

Key parameters involved in the reduction of $NO_x$ emissions from the flue gases, and disposal of the sludge, are summarized in FIG. 7. Injector orientation, the number of injectors, particles size, particle velocity, flue gas velocity, sludge nitrogen partitioning, sludge water content and temperature affect the mixing and ammonia/non-ammonia release. Fragmentation and deposit control also depend on particle size and distance traveled, which in turn relates to particle velocity. These factors are also affected by excess $O_2$ levels present in the flue gas, which in turn are related to the amount of oxygen and fuel present. Finally, the spray pattern and ash fusion temperature affect the outcome.

Figure 8:
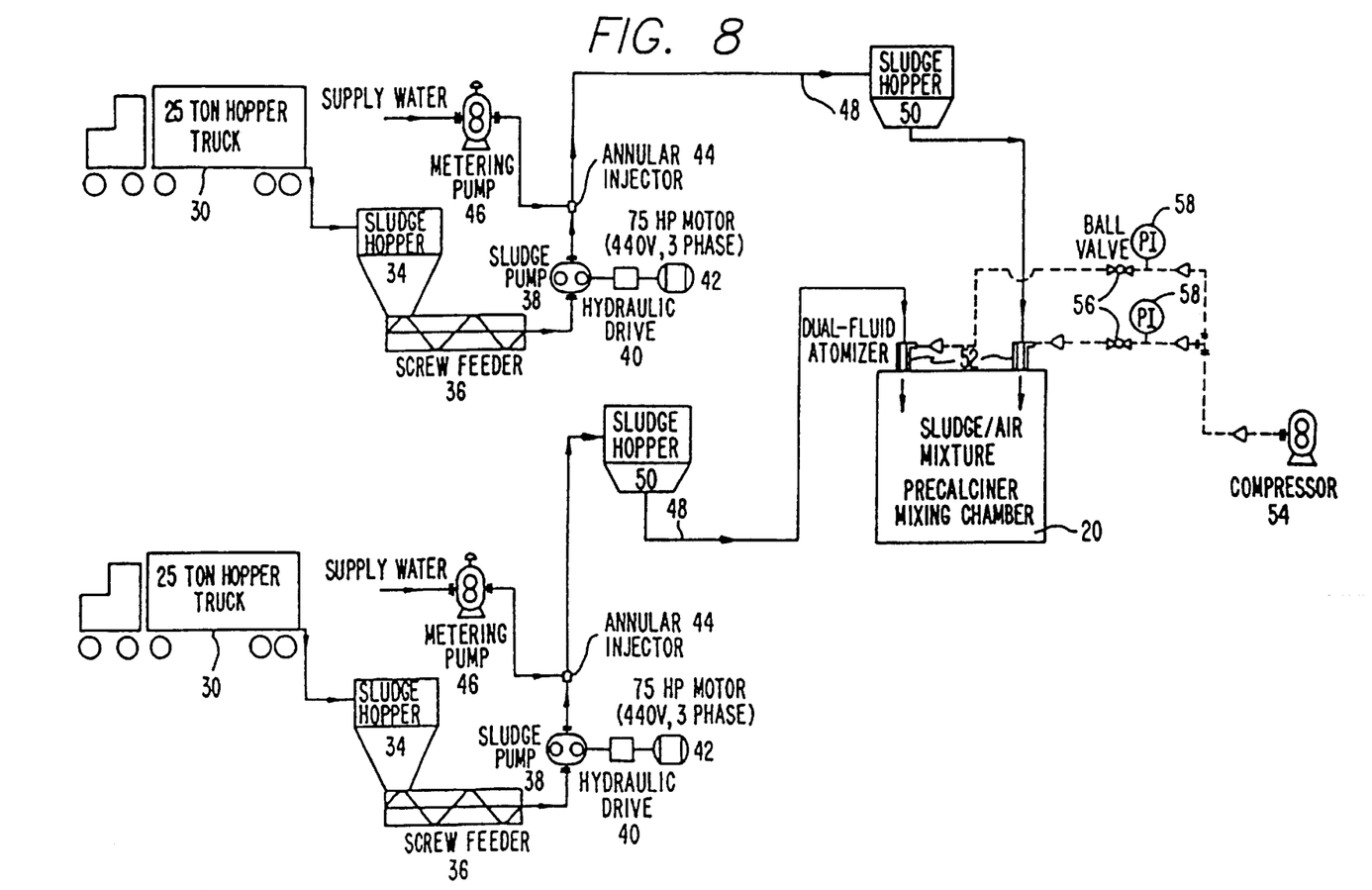
FIG. 8 is a schematic diagram for a sludge handling and feeding system for use in of the present invention.

The present invention is particularly directed to a system for the handling and feeding of sludge into the processing stream where it will be effective to produce $NO_x$ and HCl emission reduction. In a specific aspect of the invention, the sludge can be introduced into a precalciner as shown in FIG. 8. The sludge can be moved from a 25 ton hopper truck 30 via a belt conveyor 32 into a feed hopper 34. A screw feeder 36 can transfer the sludge to a sludge pump 38 operated by a hydraulic drive 40 powered with a 75 horsepower motor 42. Preferably, water is injected through an injector 44 into the sludge pumped out of the sludge pump to provide lubrication. More preferably, a metering pump 46 is installed to control the rate of injection of water. In a specific aspect, the water is injected at a rate of about 24 gallons per hour. In this specific embodiment, the sludge is pumped from the sludge pump through an 8 inch pipe 48 at a rate of approximately 40–80 gallons per minute of wet sludge containing approximately 25% solids. The sludge reaches a rotary atomization system 50 pressurized with 800 SCFM 100 PSIG steam or air. Thus, the sludge is introduced in particulate form into the precalciner 20.

Figure 9:
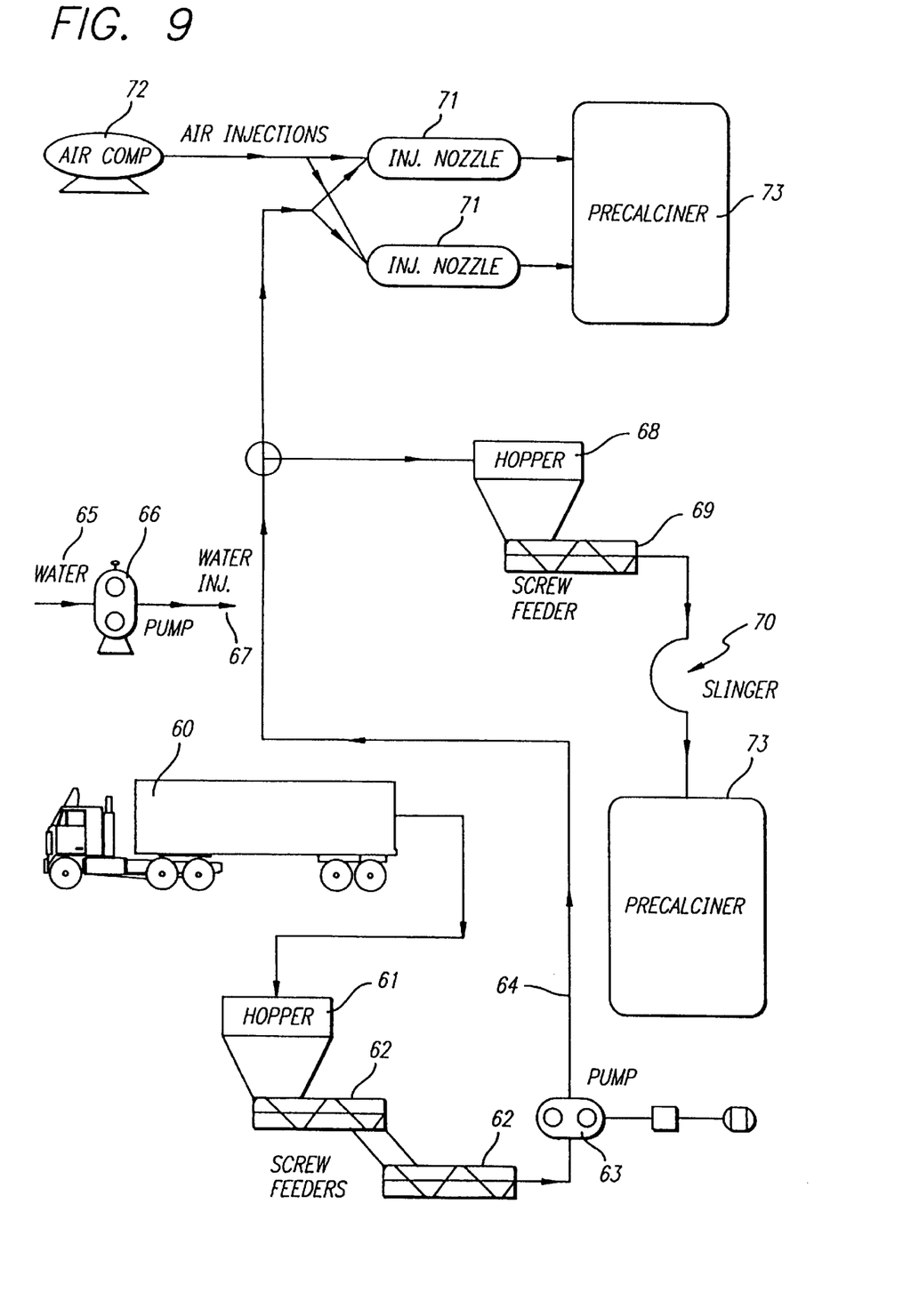
FIG. 9 is a schematic diagram of a preferred sludge handling and feeding system of the present invention.

FIG. 9 illustrates a preferred embodiment of the present invention. A truck 60 discharges sludge into the first receiving means which is conveniently a sludge hopper 61 having a capacity of about 0.5–100 tons; a typically sized hopper 61 will have a capacity of 60 tons. Two variable speed screws 62 located under hopper 61 transport the sludge into a hydraulic piston pump 63 and thence into sludge conduit 64, i.e. a steel pipe. Annular water 65 is preferably injected into conduit 64 by means of pump 66 and water injector 67, thereby lubricating the sludge and reducing friction in conduit 64. The aqueous sludge then proceeds into two pathways. One pathway provides for air injection into a precalciner 73 through injection nozzles 71, with air having been supplied under pressure by means of air compressor 72. In the second pathway, sludge is transported from conduit 64 to a second receiving means such as sludge slinger surge bin hopper 68 which has a capacity of about 1 to 100 cubic feet, e.g. 60 cubic feet. Sludge is discharged from hopper 68 by means of screw 69 which causes the sludge to be transported to sludge slinger 70 which injects the sludge into precalciner 73.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

Various publications are cited herein, the disclosures of which are incorporated by reference in their entireties.

What is claimed is:

1. A system for handling and feeding aqueous sludge to a combustor such that pollutant emissions resulting from combustion of the sludge are reduced, said system comprising:

(a) means for combustion including a cement kiln containing a flue gas outlet;

(b) a precalciner associated with the kiln, said precalciner containing a flue gas outlet;

(c) first receiving means for receiving the sludge to be combusted;

(d) means for transporting the sludge from said first receiving means to a sludge conduit; and (e) means for introducing the sludge from the sludge conduit into the means for combustion at a point located in the precalciner flue gas outlet downstream of a precalciner combustion zone and at a point wherein the gases in the kiln flue gas outlet and the precalciner flue gas outlet are mixed which is effective to reduce pollutant emissions produced by the combustion of the sludge in the means for combustion.

2. The system of claim 1 wherein the means for introducing the sludge into the means for combustion comprise an atomization system located at the point at which the sludge is introduced.

3. The system of claim 2 wherein the means for introducing the sludge into the means for combustion further comprise pumping means for transferring the sludge to the atomization system, said pumping means being in fluid communication with the atomization system.

4. The system of claim 1 wherein the means for introducing the sludge into the means for combustion further comprise means for introducing water into the sludge, whereby the water lubricates the sludge.

5. The system of claim 1 wherein the first receiving means comprise at least one sludge hopper having a capacity in the range of about 0.5 to 100 tons.

6. The system of claim 1 wherein the means for transporting the sludge from the first means to the sludge conduit further comprise at least one screw feeder.

7. The system of claim 6 wherein the means for transporting the sludge from the first receiving means to the sludge conduit further comprise pumping means in fluid communication with the screw feeder.

8. The system of claim 1 including a second means for receiving for receiving at least a part of the sludge from the sludge conduit, said second receiving means interposed between the sludge conduit and the means for combustion.

9. The system of claim 8 wherein the second receiving means comprise at least one sludge slinger surge bin hopper having a capacity of about 1 to 100 cubic feet.

10. The system of claim 9 which further includes a sludge slinger and at least one screw feeder coupled between an outlet of the hopper and an inlet of the sludge slinger, said sludge slinger having the capability of injecting the sludge into said means for combustion.

11. A system for handling and feeding aqueous sludge to a combustor such that pollutant emissions resulting from combustion of the sludge are reduced, said system comprising:

(a) means for combustion;

(b) first means for receiving the sludge to be combusted;

(c) means for transporting the sludge from said first means for receiving to a sludge conduit;

(d) means for introducing the sludge from the sludge conduit into the means for combustion at a point effective to reduce pollutant emissions produced by the combustion of the sludge in the means for combustion; and (e) means for introducing water into the sludge, whereby the water lubricates the sludge.

12. A system for handling and feeding aqueous sludge to a combustor such that pollutant emissions resulting from combustion of the sludge are reduced, said system comprising:
(a) means for combustion;
(b) first means for receiving the sludge to be combusted;
(c) means for transporting the sludge from said first means for receiving to a sludge conduit;
(d) means for introducing the sludge from the sludge conduit into the means for combustion at a point effective to reduce pollutant emissions produced by the combustion of the sludge in the means for combustion;
(e) a second means for receiving interposed between the sludge conduit and the means for combustion for receiving at least part of the sludge from the sludge conduit which includes at least one sludge slinger surge bin hopper having a capacity of about 1 to 100 cubic feet; and
(f) a sludge slinger and at least one screw feeder coupled between an outlet of the hopper and an inlet of the sludge slinger, said sludge slinger having the capacity of injecting the sludge into said means for combustion.

13. A system for handling and feeding aqueous sludge to a combustor such that pollutant emissions resulting from combustion of the sludge are reduced comprising:
(a) means for combustion including a cement kiln having a flue gas outlet;
(b) first means for receiving the sludge to be combusted;
(c) means for transporting the sludge from said first means for receiving for combustion to a sludge conduit; and
(d) means for introducing the sludge from the sludge conduit into the means for combustion at a point in said flue gas outlet effective to reduce pollutant emissions produced by the combustion of the sludge in the means for combustion.

* * * * *